(12) United States Patent
Wang et al.

(10) Patent No.: US 11,863,447 B2
(45) Date of Patent: Jan. 2, 2024

(54) ROUTE PROCESSING METHOD AND NETWORK DEVICE

(71) Applicant: HUAWEI TECHNOLOGIES CO., LTD., Guangdong (CN)

(72) Inventors: Haibo Wang, Beijing (CN); Shunwan Zhuang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 312 days.

(21) Appl. No.: 17/306,740

(22) Filed: May 3, 2021

(65) Prior Publication Data

US 2021/0258256 A1 Aug. 19, 2021

Related U.S. Application Data

(63) Continuation of application No. PCT/CN2019/115174, filed on Nov. 2, 2019.

(30) Foreign Application Priority Data

Nov. 2, 2018 (CN) .......................... 201811302078.3

(51) Int. Cl.
*H04L 45/745* (2022.01)
*H04L 9/08* (2006.01)
(Continued)

(52) U.S. Cl.
CPC .......... *H04L 45/745* (2013.01); *H04L 9/0825* (2013.01); *H04L 45/02* (2013.01); *H04L 45/30* (2013.01); *H04L 45/64* (2013.01)

(58) Field of Classification Search
CPC ..... H04L 45/745; H04L 9/0825; H04L 45/30; H04L 45/64; H04L 45/02; H04L 63/1408; H04L 63/1425; H04L 47/125
See application file for complete search history.

(56) References Cited

U.S. PATENT DOCUMENTS 8,098,584 B2 1/2012 Zhang et al.
10,015,081 B1 7/2018 Heitz
(Continued)

FOREIGN PATENT DOCUMENTS

CN 1921394 A 2/2007
CN 101155054 A 4/2008
(Continued)

OTHER PUBLICATIONS

G. Huston et al, Validation of Route Origination using the Resource Certificate PKI and ROAs, draft-ietf-sidr-roa-validation-10.txt, Secure Inter-Domain Routing (SIDR), Internet-Draft, Nov. 11, 2010, 10 pages.
(Continued)

*Primary Examiner* — Iqbal Zaidi
(74) *Attorney, Agent, or Firm* — HUAWEI TECHNOLOGIES CO., LTD.

(57) ABSTRACT

This application discloses a route processing method and a network device. The network device obtains a route prefix and autonomous system information associated with the obtained route prefix, where the associated autonomous system information includes to-be-verified autonomous system information. The network device verifies whether there is a match item in a route origin information base, where the match item includes the obtained route prefix and the to-be-verified autonomous system information; and determines, based on a verification result, whether to send the obtained route prefix. The network device verifies the autonomous system information associated with the to-be-sent route prefix before sending the route prefix. This reduces a possibility that the network device sends route information carrying incorrect autonomous system information, and reduces a possibility of causing an abnormal network flow direction.

23 Claims, 6 Drawing Sheets

(51) Int. Cl.
  *H04L 45/02* (2022.01)
  *H04L 45/30* (2022.01)
  *H04L 45/64* (2022.01)

(56) References Cited

U.S. PATENT DOCUMENTS

| | | | |
|---|---|---|---|
| 10,715,543 B2* | 7/2020 | Jakobsson | H04L 63/1433 |
| 2011/0093612 A1 | 4/2011 | Murakami | |
| 2013/0282920 A1 | 10/2013 | Zhang et al. | |
| 2014/0082216 A1 | 3/2014 | Patel et al. | |
| 2015/0207818 A1 | 7/2015 | Gagliano et al. | |
| 2015/0288595 A1* | 10/2015 | Suzuki | H04L 45/033 370/254 |
| 2016/0020941 A1 | 1/2016 | Asati et al. | |
| 2018/0131604 A1* | 5/2018 | Zhou | H04L 45/44 |

FOREIGN PATENT DOCUMENTS

| | | |
|---|---|---|
| CN | 101588343 A | 11/2009 |
| CN | 102158469 A | 8/2011 |
| CN | 102957606 A | 3/2013 |
| CN | 105376098 A | 3/2016 |
| CN | 106059932 A | 10/2016 |
| CN | 106060014 A | 10/2016 |
| CN | 108092897 A | 5/2018 |
| CN | 108718247 A | 10/2018 |
| JP | 2009164917 A | 7/2009 |
| JP | 2011087302 A | 4/2011 |
| KR | 20170094441 A | 8/2017 |

OTHER PUBLICATIONS

Tomoya Yoshida, A Proposal of the next-generation BGP routing architecture using IPR, The Institute of Electronics, Information and Communication Engineers Technical Report, vol. 106, No. 462, Jan. 11, 2007, 8 pages.

Huston G Michaelson Apnic G: Validation of Route Origination using the Resource Certificate PKI and ROAs; draft-ietf-sidr-roa-validation-10.txt, Nov. 11, 2010, 10 pages.

Request for Comments: 4271, Y. Rekhter, Ed. et al, A Border Gateway Protocol 4 (BGP-4), Network Working Group, Jan. 2006, total 104 pages.

Request for Comments: 4632, V. Fuller et al, Classless Inter-domain Routing (CIDR):The Internet Address Assignment and Aggregation Plan, Network Working Group, Aug. 2006, total 27 pages.

Request for Comments: 5065, P. Traina et al, Autonomous System Confederations for BGP, Network Working Group, Aug. 2007, total 14 pages.

Request for Comments: 6810, R. Bush et al, The Resource Public Key Infrastructure (RPKI) to Router Protocol, Internet Engineering Task Force (IETF), Jan. 2013, total 27 pages.

Request for Comments: 6811, P. Mohapatra et al, BGP Prefix Origin Validation, Internet Engineering Task Force (IETF), Jan. 2013, total 10 pages.

Request for Comments: 7705, W. George et al, Autonomous System Migration Mechanisms and Their Effects on the BGP AS_PATH Attribute, Internet Engineering Task Force (IETF), Nov. 2015, total 16 pages.

Request for Comments: 8481, R. Bush et al, Clarifications to BGP Origin Validation Based on Resource Public Key Infrastructure (RPKI), Internet Engineering Task Force (IETF), Sep. 2018, total 5 pages.

* cited by examiner

ROUTE PROCESSING METHOD AND NETWORK DEVICE

CROSS-REFERENCE TO RELATED APPLICATIONS

This application is a continuation of International Application No. PCT/CN2019/115174, filed on Nov. 2, 2019, which claims priority to Chinese Patent Application No. 201811302078.3, filed on Nov. 2, 2018. The disclosures of the aforementioned applications are hereby incorporated by reference in their entireties.

TECHNICAL FIELD

The present invention relates to the communications field, and in particular, to a route processing method and a network device.

BACKGROUND

A resource public key infrastructure (resource public key infrastructure, RPM) solution is used to verify whether border gateway protocol (Border Gateway Protocol, BGP) route origin information is correct. A distributed RPM server collects information such as a source AS number corresponding to a BGP route initiated by each autonomous system (autonomous system, AS) and a route prefix of the BGP route, where the route prefix includes a mask. A router establishes a connection with the RPM server, and locally stores route origin authorization (route origin authorization, ROA) data. The data includes a relationship between a route prefix and a source autonomous system that generates the route prefix. After receiving, from a neighboring node, route information including a route prefix, the router verifies, based on the locally stored ROA data, whether a source AS corresponding to the route prefix received from the neighboring node is correct. For details about an RPM, refer to request for comments: RFC 6810 and RFC 6811 of the standard organization, the internet engineering task force (internet engineering task force, IETF).

However, not all routers in a network verify, based on ROA data, source AS information associated with received route prefixes. In this case, if source AS information associated with a received route prefix is incorrectly modified, route calculation by a receiver router is affected. As a result, data traffic between autonomous systems is not transmitted along a planned path. A network administrator for an AS usually configures an outbound route policy for a router. If the outbound route policy includes modifying AS path information associated with a to-be-sent route prefix, the router modifies the AS path information associated with the route prefix according to the outbound route policy before sending the route prefix. Consequently, the foregoing problem may arise due to the incorrect manual configuration.

SUMMARY

This application provides a route processing method and a network device, to verify autonomous system information associated with a to-be-sent route prefix before the route prefix is sent, reduce a possibility that the network device sends route information carrying incorrect autonomous system information, and reduce a possibility of causing an abnormal network flow direction.

According to a first aspect, an embodiment of the present disclosure provides a route processing method. The method is applied to a network device in a first autonomous system, and includes: obtaining a route prefix and autonomous system information associated with the obtained route prefix, where the associated autonomous system information includes to-be-verified autonomous system information; verifying, by the network device, whether there is a match item in a route origin information base, where the match item includes the obtained route prefix and the to-be-verified autonomous system information; and determining, based on a verification result, whether to send the obtained route prefix.

In the method, before sending the route prefix, the network device first verifies the to-be-verified autonomous system information associated with the route prefix, and determines, based on the verification result, whether to send the route prefix. This reduces a possibility that the network device sends route information carrying incorrect autonomous system information, and reduces a possibility of causing an abnormal network flow direction.

In a possible design of the first aspect, an entry of the route origin information base records a correspondence between a route prefix and a source autonomous system, and the to-be-verified autonomous system information is source autonomous system information in the associated autonomous system information; an entry of the route origin information base records a correspondence between a route prefix and an autonomous system pair, and the to-be-verified autonomous system information is autonomous system path information in the associated autonomous system information; or the to-be-verified autonomous system information includes source autonomous system information in the associated autonomous system information and autonomous system path information in the associated autonomous system information. In the design, the source autonomous system information may be verified, the autonomous system path information may be verified, or both may be verified. Each verification cannot ensure that the autonomous system information associated with the sent route prefix is correct. Therefore, a plurality of verification manners may be simultaneously used to improve accuracy in the verification.

In a possible design of the first aspect, the route origin information base is obtained from a resource public key infrastructure server. For example, the route origin information base may be downloaded by the network device from the resource public key infrastructure server, or actively sent (for example, periodically sent or sent as required) by the resource public key infrastructure server to the network device. In another possible design, the network device does not locally store the route origin information base, but sends to-be-verified content to the resource public key infrastructure server when the network device needs to perform verification. In the design, the resource public key infrastructure server in the current technology may be used, and there is no need to develop an additional protocol or architecture.

In a possible design of the first aspect, the associated autonomous system information is autonomous system information after modification according to an outbound route policy configured on the network device. In the design, whether the autonomous system information after modification according to the outbound route policy is correct can be verified, where the outbound route policy is usually manually configured. Therefore, this design can reduce an error caused by manual configuration.

In a possible design of the first aspect, the obtaining a route prefix includes: receiving the route prefix from a second autonomous system; generating the route prefix; or receiving the route prefix generated by another network device in the first autonomous system. In the design, the to-be-verified route prefix may be received by the network device from another autonomous system, generated by the network device, or generated by the another network device in the autonomous system to which the network device belongs. This provides flexible verification.

In a possible design of the first aspect, the network device is a border node in the first autonomous system. Further, the border node may be an outbound border node in the first autonomous system in a route sending direction. Usually, an autonomous system path in autonomous system information is not modified when internal nodes in the autonomous system send route information to each other. Therefore, a verification function may be deployed on the outbound border node, and an internal node in the first autonomous system is not required to perform verification.

In a possible design of the first aspect, when there is an entry matching the obtained route prefix in the route origin information base, and autonomous system information in the entry is different from the to-be-verified autonomous system information, the network device determines that there is no match item in the route origin information base, and determines not to send the obtained route prefix. When determining that there is no match item, the network device does not send the route prefix. This reduces a possibility of sending the route prefix associated with the incorrect autonomous system information.

In a possible design of the first aspect, the network device outputs alarm information after determining that there is no match item in the route origin information base. The alarm information is output in a timely manner, to notify a network administrator that mismatching occurs on autonomous system information in the network device.

In a possible design of the first aspect, when there is an entry matching the obtained route prefix in the route origin information base, and autonomous system information in the entry is the same as the to-be-verified autonomous system information, the network device determines that there is the match item in the route origin information base, determines to send the obtained route prefix, and sends route information carrying the obtained route prefix. When determining that there is the match item, the network device sends the route prefix. This improves accuracy of the autonomous system information associated with the sent route prefix.

In a possible design of the first aspect, when there is no entry matching the obtained route prefix in the route origin information base, the network device determines that there is no match item in the route origin information base. A verification result in this case is considered to be "unknown". When this case occurs, whether to send the obtained route prefix is determined according to a preconfigured policy. The preconfigured policy may be sending the obtained route prefix or not sending the obtained route prefix. In this way, when the verification result is "unknown", there may be a related measure.

According to a second aspect, an embodiment of the present disclosure provides a network device. The network device is a network device in a first autonomous system. The network device may be configured to perform the method in any one of the first aspect or the possible implementations of the first aspect. Specifically, the network device includes a module configured to perform the method in any one of the first aspect or the possible implementations of the first aspect.

According to a third aspect, an embodiment of the present disclosure provides a network device. The network device is a network device in a first autonomous system and includes an obtaining module, a verification module, and a determining module. The obtaining module includes a route prefix obtaining sub-module and an autonomous system information obtaining sub-module, where the route prefix obtaining sub-module is configured to obtain a route prefix, the autonomous system information obtaining sub-module is configured to obtain autonomous system information associated with the obtained route prefix, and the associated autonomous system information includes to-be-verified autonomous system information. The verification module is configured to verify whether there is a match item in a route origin information base, where the match item includes the obtained route prefix and the to-be-verified autonomous system information. The determining module is configured to determine, based on a verification result, whether to send the obtained route prefix.

In a possible design of the third aspect, an entry of the route origin information base records a correspondence between a route prefix and a source autonomous system, and the to-be-verified autonomous system information is source autonomous system information in the associated autonomous system information; an entry of the route origin information base records a correspondence between a route prefix and an autonomous system pair, and the to-be-verified autonomous system information is autonomous system path information in the associated autonomous system information; or the to-be-verified autonomous system information includes source autonomous system information in the associated autonomous system information, and the autonomous system path information in the associated autonomous system information.

In a possible design of the third aspect, the network device further includes a route origin information base obtaining module, configured to obtain the route origin information base from a resource public key infrastructure server. For example, the route origin information base may be downloaded by the network device from the resource public key infrastructure server, or actively sent by the resource public key infrastructure server to the network device.

In a possible design of the third aspect, the associated autonomous system information obtained by the autonomous system information obtaining sub-module is autonomous system information after modification according to an outbound route policy configured on the network device.

In a possible design of the third aspect, the route prefix obtaining sub-module is configured to receive the obtained route prefix from a second autonomous system, or generate the obtained route prefix.

In a possible design of the third aspect, the network device is a border node in the first autonomous system.

In a possible design of the third aspect, the verification module is configured to: when there is an entry matching the obtained route prefix in the route origin information base, and autonomous system information in the entry is different from the to-be-verified autonomous system information, determine that there is no match item in the route origin information base; and correspondingly, the determining module determines not to send the obtained route prefix.

In a possible design of the third aspect, an alarm module is further included and is configured to output alarm information after the verification module determines that there is no match item in the route origin information base.

In a possible design of the third aspect, the network device further includes a sending module; the verification module is configured to: when there is an entry matching the obtained route prefix in the route origin information base, and autonomous system information in the entry is the same as the to-be-verified autonomous system information, determine that there is the match item in the route origin information base; and correspondingly, the determining module determines to send the obtained route prefix, and the sending module sends route information carrying the obtained route prefix.

According to a fourth aspect, an embodiment of the present disclosure provides a network device. The network device is a network device in a first autonomous system. The network device includes a processor, a memory, and a communications interface. The processor, the memory, and the communications interface are connected to each other. The memory is configured to store a computer program. The computer program includes a program instruction. The processor is configured to invoke the program instruction, to perform the method in any one of the first aspect or the possible implementations of the first aspect.

According to a fifth aspect, an embodiment of the present disclosure provides a network device. The network device is a network device in a first autonomous system. The network device includes a processor, a memory, and a communications interface. The processor, the memory, and the communications interface are connected to each other. The memory is configured to store a computer program. The computer program includes a program instruction. The processor is configured to invoke the program instruction, to implement functions of the autonomous system information obtaining sub-module, the verification module, and the determining module in the third aspect or the possible designs of the third aspect, and a function of generating the obtained route prefix by the route prefix obtaining sub-module in the possible designs of the third aspect. The communications interface is configured to implement functions of the route origin information base obtaining module, the alarm module, and the sending module in the possible designs of the third aspect.

According to a sixth aspect, an embodiment of the present disclosure provides a network device. The network device is a network device in a first autonomous system. The network device includes a processor, a memory, and a communications interface. The processor, the memory, and the communications interface are connected to each other. The memory is configured to store a computer program. The computer program includes a program instruction. The processor is configured to invoke the program instruction, to implement functions of the verification module and the determining module in the third aspect or the possible designs of the third aspect. The communications interface is configured to implement a function of receiving the obtained route prefix from the second autonomous system by the route prefix obtaining sub-module in possible designs of the third aspect, and functions of the route origin information base obtaining module, the alarm module, and the sending module. The communications interface and the processor cooperate to implement a function of the autonomous system information obtaining sub-module in the third aspect or the possible designs of the third aspect. Alternatively, the communications interface independently implements a function of the autonomous system information obtaining sub-module in the third aspect.

For beneficial effects of the network device provided in the foregoing aspects, refer to the descriptions of the beneficial effects in the first aspect and the possible designs of the first aspect. Details are not described herein again.

According to a seventh aspect, an embodiment of the present disclosure provides a computer-readable storage medium. The computer-readable storage medium stores a program. When the program is executed on a computer, the computer is enabled to perform the method in any one of the first aspect or the possible designs of the first aspect.

According to an eighth aspect, an embodiment of the present disclosure provides a route processing apparatus, including hardware related to a program instruction. The hardware is configured to perform the method in any one of the first aspect or the possible designs of the first aspect.

BRIEF DESCRIPTION OF DRAWINGS

To describe the technical solutions of the present disclosure more clearly, the following briefly describes the accompanying drawings used in the embodiments. Apparently, the accompanying drawings in the following description show merely some embodiments of the present disclosure, and a person of ordinary skill in the art may still derive other technical solutions and accompanying drawings from these accompanying drawings without creative efforts.

DESCRIPTION OF EMBODIMENTS

Figure 1:
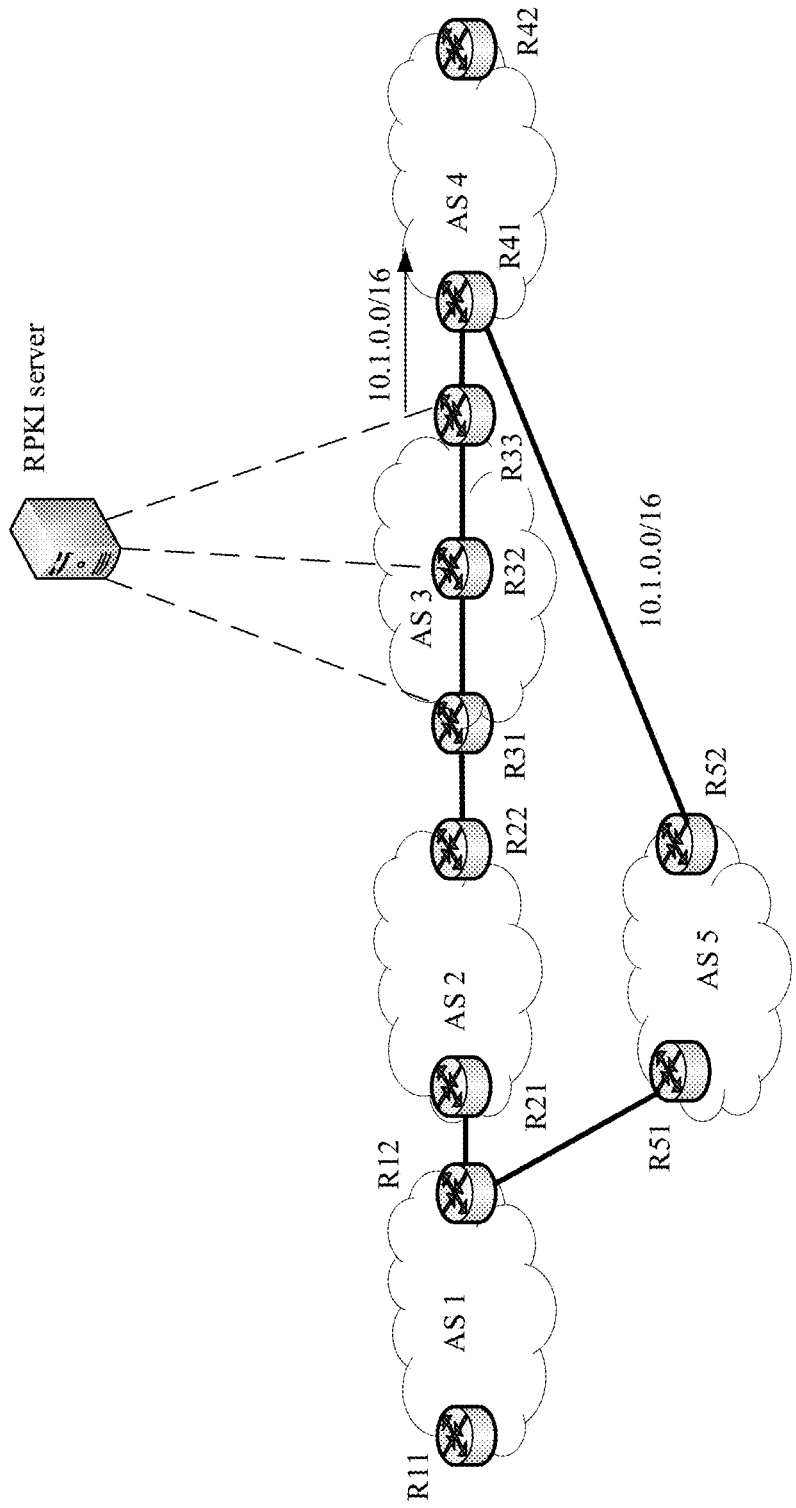
FIG. 1 is a schematic diagram of an application scenario according to an embodiment of the present disclosure.

FIG. 1 is a schematic diagram of an application scenario according to an embodiment of the present disclosure. FIG. 1 includes an autonomous system AS 1, an AS 2, an AS 3, an AS 4, and an AS 5. The AS 1 includes border nodes R11 and R12 in the AS 1. The AS 2 includes border nodes R21 and R22 in the AS 2. The AS 3 includes border nodes R31 and R33 in the AS 3, and also includes an internal node R32 in the AS 3. The AS 4 includes border nodes R41 and R42 in the AS 4. The AS 5 includes border nodes R51 and R52 in the AS 5. Each border node may be a network device having a route function. For example, the border node is a router or a switch having a route function.

The following describes a case of an abnormal network flow direction in the current technology. If the AS 1 generates a route prefix 10.1.0.0/16, and sends 10.1.0.0/16 to the AS 4 through the AS 2 and the AS 3. In addition, the AS 1 also sends 10.1.0.0/16 to the AS 4 through another AS path, namely, the AS 5. The R41 separately receives route information including the route prefix 10.1.0.0/16 from the R33 and the R52. Route information received from the R33 includes 10.1.0.0/16 and an AS path corresponding to 10.1.0.0/16 (AS 3, AS 2, AS 1). The marking mode "(AS 3, AS 2, AS 1)" indicates that a source AS corresponding to 10.1.0.0/16 is the AS 1, and 10.1.0.0/16 passes through the AS 1, the AS 2, and the AS 3 in sequence. Route information received from the R52 includes 10.1.0.0/16 and an AS path corresponding to 10.1.0.0/16 (AS 5, AS 1). The marking mode "(AS 5, AS 1)" indicates that a source AS corresponding to 10.1.0.0/16 is the AS 1, and 10.1.0.0/16 passes through the AS 1 and the AS 5 in sequence. When calculating a route to 10.1.0.0/16, the R41 selects the R52 as a next hop according to a rule of selecting a shorter AS path. In other words, the R41 sends a data packet with a destination to 10.1.0.0/16 to the R52 instead of the R33. It is assumed that the foregoing description is based on a normal flow direction in network planning. However, an administrator for the AS 3 may configure an outbound route policy on the R33. The outbound route policy affects AS path information in route information sent by the R33 to the outside. For example, if the outbound route policy on the R33 is incorrectly configured, a normal AS path (AS 3, AS 2, AS 1) for sending 10.1.0.0/16 by the R33 to the outside is changed to (AS 3). As a result, the R41 sends the data packet with the destination to 10.1.0.0/16 to the R33, and an abnormal network flow direction is caused.

Embodiments of the present disclosure provide a route processing method and a corresponding network device. The method and the network device are based on a same inventive concept, and the method and the network device have similar principles for resolving a problem. Therefore, mutual reference may be made between a network device embodiment and a method embodiment, and no repeated description is provided.

In the embodiments of the present disclosure, in the application scenario shown in FIG. 1, a route origin information base server, for example, an RPM server, is disposed. The R33 may obtain route origin verification data from the RPM server to form a route origin information base. The route origin verification data may be ROA data, or autonomous system path authorization (autonomous system path authorization, ASPA) data. The ROA data describes a correspondence between a route prefix and a source autonomous system, and is used to verify whether a source AS corresponding to a route prefix is correct. The ASPA data describes a correspondence between a route prefix and an autonomous system pair, and is used to verify whether AS path information corresponding to a route prefix is correct. Certainly, an ROA database and an ASPA database may be implemented as one database, to provide source AS verification information and AS path verification information. In this way, before the R33 sends route information carrying 10.1.0.0/16 to the R41 in the AS 4, the R33 may first verify a route origin, for example, verify whether the source AS is correct, verify whether the AS path is correct, or verify whether the source AS and the AS path are correct. If the verification succeeds, the R33 sends the route information carrying 10.1.0.0/16. This reduces a possibility of causing an abnormal network flow direction.

The foregoing describes a case in which the R33 receives, from the AS2, 10.1.0.0/16 originated from the AS 1. In another case, if 10.1.0.0/16 is generated by the AS 3, for example, generated by the R31, the R32, or the R33, when a route device in the AS 3 sends 10.1.0.0/16, there is no solution in the current technology for verifying whether a route origin corresponding to 10.1.0.0/16 is correct, because IETF RFC 6810 and IETF RFC 6811 specify that a receiver of route information verifies only a route origin corresponding to received route information. In the embodiments of the present disclosure, the R33 may verify a route prefix generated by the AS 3 and then send the route prefix. This improves accuracy of AS origin information corresponding to the route prefix sent by the R33 to the outside, and reduces a possibility of causing an abnormal network flow direction.

The network device described in the embodiments of the present disclosure may be a device having a route function. For example, the network device is a router, or a switch having a route function.

Figure 2:
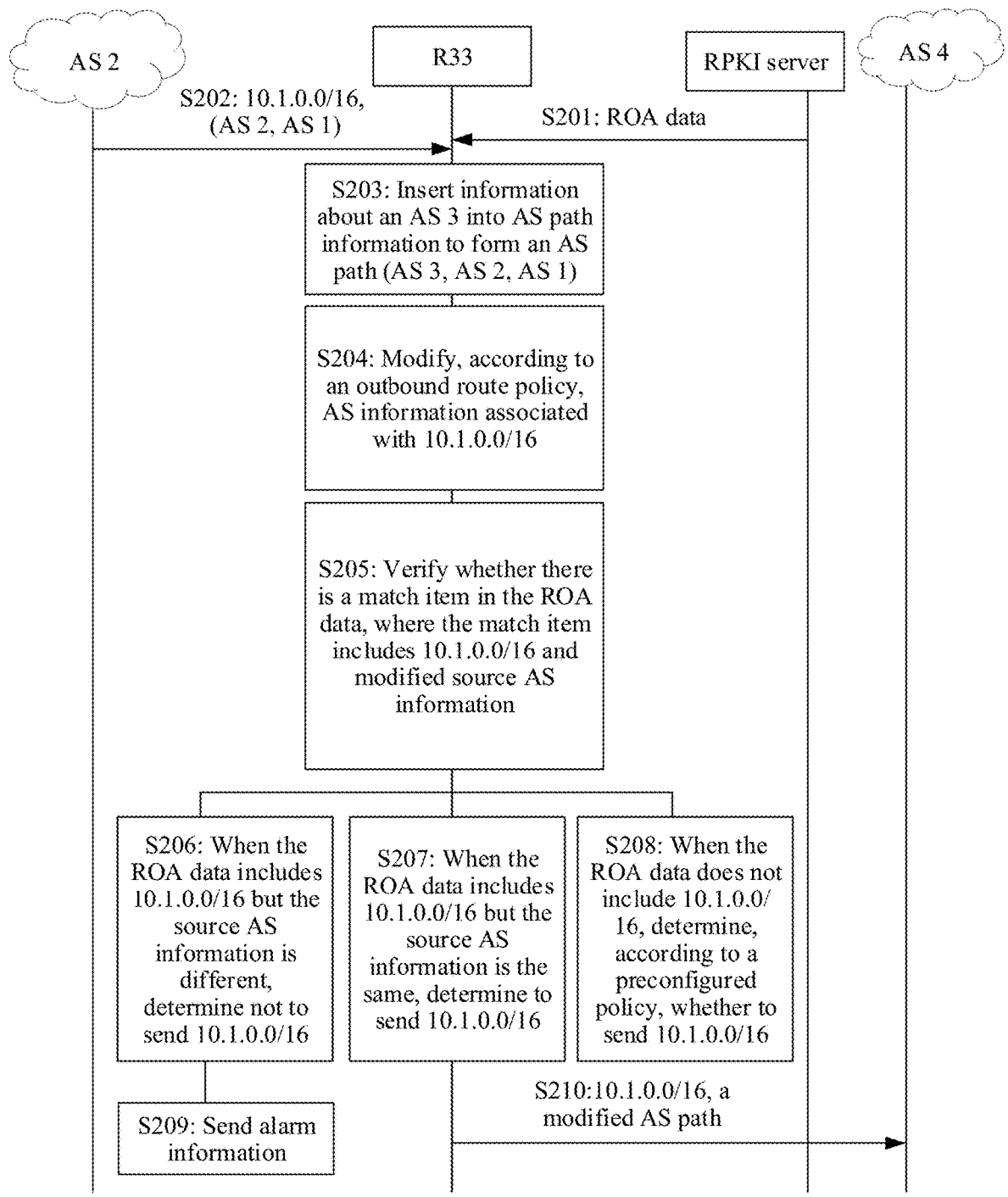
FIG. 2 is a schematic flowchart of a method according to an embodiment of the present disclosure.

FIG. 2 is a schematic flowchart of a method according to an embodiment of the present disclosure. With reference to FIG. 1, an R33 in FIG. 1 is used as an execution body, and a route prefix 10.1.0.0/16 is used as an example.

S201: The R33 downloads ROA data from an RPM server, so that the R33 locally stores the ROA data, where the ROA data is also referred to as an ROA base. An entry in the ROA base records a correspondence between a route prefix and a source AS, and is used to verify whether a source AS corresponding to a route prefix is correct.

For example, in a network planning phase, if an administrator for an AS 1 registers the AS 1 as a source AS corresponding to 10.1.0.0/16 with an international organization corresponding to the RPM server, the ROA data downloaded by the R33 includes a correspondence between 10.1.0.0/16 and the source AS 1, in other words, the ROA data downloaded by the R33 includes 10.1.0.0/16, and the source AS corresponding to 10.1.0.0/16 is the AS 1.

It may be understood that the ROA data may not need to be downloaded each time the method shown in the embodiment in FIG. 2 is performed.

S202: The R33 receives, from an AS 2, a piece of route information originated from the AS 1, where the piece of route information carries the route prefix 10.1.0.0/16, and corresponding AS path information is (AS 2, AS 1), indicating that 10.1.0.0/16 originates from the AS 1 and passes through the AS 2. For example, the R33 receives the route information from an R32.

S203: Before the R33 forwards 10.1.0.0/16 to an AS 4, the R33 inserts, in the AS path information corresponding to 10.1.0.0/16, information about an AS in which the R33 is located. The R33 inserts information about an AS 3 in the AS path information to form a new AS path (AS 3, AS 2, AS 1), indicating that 10.1.0.0/16 originates from the AS 1 and passes through the AS 2 and the AS 3 in sequence.

S204: Before the R33 forwards 10.1.0.0/16 to the AS 4, the R33 modifies AS information according to an outbound route policy configured on the R33. AS information after modification includes to-be-verified source AS information.

In the embodiment in FIG. 2, the AS information used before verification is performed is referred to as autonomous system information associated with the route prefix, and the autonomous system information associated with the route prefix includes the to-be-verified source AS information. For example, assuming that an AS path after modification in step S204 is (AS 3), the AS path (AS 3) is referred to as AS information associated with 10.1.0.0/16. Steps S203 and S204 are optional steps. When step S203 is performed but step S204 is not performed, the AS path (AS 3, AS 2, AS 1) in step S203 is referred to as the AS information associated with 10.1.0.0/16. When neither step S203 nor step S204 is performed, the AS path (AS 2, AS 1) in step S202 is referred to as the AS information associated with 10.1.0.0/16.

S205: The R33 verifies whether there is a match item in the ROA data, where the match item includes 10.1.0.0/16 and the to-be-verified source AS information in the AS information after modification in step S204.

The following describes three cases.

Case 1

It is assumed that there is an entry matching 10.1.0.0/16 in the ROA base and a source AS in the entry is the AS 1. If step S204 is not performed, or the AS path after modification in step S204 is changed to (AS 9, AS 2, AS 1), the to-be-verified source AS information is the AS 1. For 10.1.0.0/16, a to-be-verified source AS is the same as the source AS in the ROA base, and both are the AS 1. The R33 determines that the ROA data includes the match item, and performs step S207.

Case 2

It is assumed that the ROA base includes an entry matching 10.1.0.0/16, a source AS in the entry is the AS 1, and the AS path after modification in step S204 is (AS 3, AS 2, AS 9). In this case, the to-be-verified source AS information is the AS 9. The AS 1 is different from the AS 9. Therefore, the R33 determines that there is no match item in the ROA data, and performs step S206.

Case 3

If there is no entry matching 10.1.0.0/16 in the ROA base, the R33 determines that there is no match item in the ROA data, and performs step S208. Case 3 may also be understood as that the R33 does not know whether a to-be-verified source AS corresponding to 10.1.0.0/16 is correct. In other words, a verification result is "unknown".

It should be understood that the three cases are merely used as examples to demonstrate whether there is the match item in the ROA data. However, it should not be considered that there are only the three cases.

S206: Determine not to send 10.1.0.0/16. After step S206, step S209 may be further performed.

S207: Determine to send 10.1.0.0/16 to an R41 in the AS 4. Then, step S210 is performed.

S208: Determine, according to a preconfigured policy, whether to send 10.1.0.0/16. The preconfigured policy may be sending 10.1.0.0/16 or not sending 10.1.0.0/16.

S209: Send alarm information. For example, the alarm information may be sent to a network management workstation. The alarm information may carry the route prefix for which a verification result is mismatching, and carry information about the route prefix, for example, the AS path information.

S210: Send route information carrying 10.1.0.0/16 and the AS path after modification to the R41 in the AS 4. For example, if the AS path is modified to (AS 9, AS 2, AS 1) in step S204, the route prefix in the sent route information is 10.1.0.0/16, and the AS path in the sent route information is (AS 9, AS 2, AS 1). It should be understood that, in Case 1, if step S204 is not performed, the AS path corresponding to 10.1.0.0/16 sent in step S210 is (AS 3, AS 2, AS 1).

In the embodiment in FIG. 2, steps S201, S203, 204, and S209 are optional. In addition, a sequence of the steps is merely an example, and the steps may also be performed in another appropriate sequence. For example, step S201 may be performed before step S205.

In the embodiment shown in FIG. 2, before sending the route prefix, the R33 first verifies the source AS information corresponding to the route prefix, and determines, based on the verification result, whether to send the route prefix. This improves accuracy of the source AS information in the sent route information, and reduces a possibility of causing an abnormal network flow direction. Further, the R33 verifies the source AS information after modification according to the outbound route policy. This reduces a source AS information error caused by incorrect manual configuration. In addition, if there is no matched route prefix in the ROA base, processing is flexibly performed according to the preconfigured policy. In addition, if a matching result is mismatching in the ROA data, an alarm is sent to notify a network administrator that mismatching occurs on the source AS information in the R33.

Figure 3:
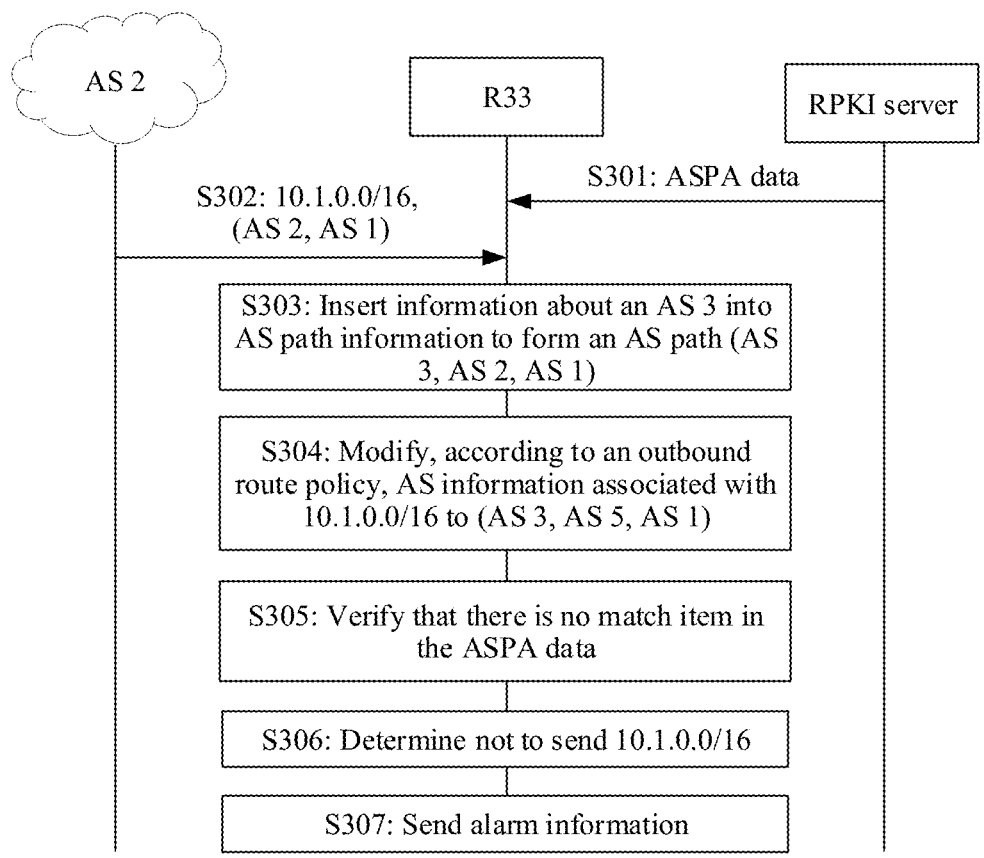
FIG. 3 is a schematic flowchart of a method according to an embodiment of the present disclosure.

FIG. 3 is a schematic flowchart of a method according to an embodiment of the present disclosure. With reference to FIG. 1, an R33 in FIG. 1 is used as an execution body, and a route prefix 10.1.0.0/16 is used as an example. The embodiment in FIG. 3 is used to verify information about an AS path corresponding to the route prefix.

S301: The R33 downloads ASPA data from an RPM server, so that the R33 locally stores the ASPA data, where the ASPA data is also referred to as an ASPA base. An entry in the ASPA base records a correspondence between a route prefix and an autonomous system pair, and is used to verify whether an AS path corresponding to a route prefix is correct.

For example, in a network planning phase, an administrator for an AS 1 registers, with an international organization corresponding to the RPM server, that the AS 1 plans to send 10.1.0.0/16 to an AS 2. An administrator for the AS 2 registers with the international organization corresponding to the RPM server that the AS 2 plans to send 10.1.0.0/16 to an AS 3. An administrator for the AS 3 registers with the international organization corresponding to the RPM server that the AS 3 plans to send 10.1.0.0/16 to an AS 4. Therefore, the ASPA data downloaded by the R33 includes 10.1.0.0/16, and AS pairs corresponding to 10.1.0.0/16 are [AS 1, AS 2], [AS 2, AS 3] and [AS 3, AS 4]. A mark "[AS 1, AS 2]" indicates that the AS 1 sends 10.1.0.0/16 to the AS 2.

It may be understood that the ASPA data does not need to be downloaded each time when the method shown in the embodiment in FIG. 3 is performed.

For steps S302 and S303, refer to steps S202 and S203 respectively.

S304: The R33 modifies AS information according to an outbound route policy configured on the R33. AS information after modification includes to-be-verified AS path information.

In the embodiment in FIG. 3, the AS information before verification is referred to as autonomous system information associated with the route prefix, and the associated AS information includes the to-be-verified AS path information. For example, assuming that an AS path after modification in step S304 is (AS 3, AS 5, AS 1), the AS path (AS 3, AS 5, AS 1) is referred to as information about the AS associated with 10.1.0.0/16, and the to-be-verified AS path information is (AS 3, AS 5, AS 1).

S305: The R33 verifies that there is no match item in the ASPA base.

The R33 finds an entry having an AS pair matching 10.1.0.0/16 in the ASPA base, but the AS pair in the entry and the to-be-verified AS path information (AS 3, AS 5, AS 1) do not match (namely, both are not the same). This is because the to-be-verified AS path information indicates that a source AS associated with 10.1.0.0/16 is the AS 1. The AS 1 sends 10.1.0.0/16 to an AS 5, and the AS 5 sends 10.1.0.0/16 to the AS 3. Therefore, the R33 verifies that there is no match item in the ASPA base. Then, step S306 is performed.

S306: The R33 determines not to send 10.1.0.0/16. Then, step S307 is performed.

S307: The R33 sends alarm information. Step S307 is an optional step.

The following describes several other possible implementations by using examples based on the embodiment in FIG. 3. It should be understood that the implementations are not limited to these possible implementations.

In a possible case, the ASPA base includes 10.1.0.0/16, and the AS pairs corresponding to 10.1.0.0/16 are [AS 1, AS 2], [AS 2, AS 3], and [AS 3, AS 4]. Step S304 is not performed. A to-be-verified AS path is (AS 3, AS 2, AS 1). The R33 determines that there is the match item in the ASPA base, determines to send 10.1.0.0/16, and sends route information carrying 10.1.0.0 and the AS path (AS 3, AS 2, AS 1).

In a possible case, if there is no entry that matches 10.1.0.0/16 in the ASPA base, the R33 determines that there is no match item in the ASPA base, and determines, according to a preconfigured policy, whether to send 10.1.0.0/16. The preconfigured policy may be sending 10.1.0.0/16 or not sending 10.1.0.0/16. The case may also be understood as that the R33 does not know whether the to-be-verified AS path information corresponding to 10.1.0.0/16 is correct. In other words, a verification result is "unknown".

In a possible case, the ASPA base includes 10.1.0.0/16, and the AS pairs corresponding to 10.1.0.0/16 are [AS 1, AS 2], [AS 2, AS 3], and [AS 3, AS 4]. Neither step S303 nor step S304 is performed. A to-be-verified AS path is (AS 2, AS 1). Because the to-be-verified AS path matches an AS pair [AS 1, AS 2], the R33 determines that there is the match item in the ASPA base, determines to send 10.1.0.0/16, and sends route information carrying 10.1.0.0 and the AS path (AS 2, AS 1).

In a possible case, the ASPA base includes 10.1.0.0/16, and the AS pairs corresponding to 10.1.0.0/16 are [AS 1, AS 2], [AS 2, AS 3], and [AS 3, AS 4]. After step S303 is performed, an AS path is (AS 3, AS 2, AS 1). An AS path after modification in step S304 is (AS 2, AS 1). The R33 determines that there is the match item in the ASPA base, determines to send 10.1.0.0/16, sends route information carrying 10.1.0.0 and the AS path (AS 2, AS 1).

In the embodiment shown in FIG. 3, before sending the route prefix, the R33 first verifies the AS path information associated with the route prefix, and determines, based on a verification result, whether to send the route prefix, to improve accuracy of the AS path information of the sent route information, and reduce a possibility of causing an abnormal network flow direction. Further, the R33 verifies the AS path information after modification according to the outbound route policy, to reduce an AS path information error caused by incorrect manual configuration. In addition, if there is no matched route prefix in the ASPA base, processing is flexibly performed according to a preconfigured policy. In addition, if a matching result is mismatching in the ASPA data, an alarm is sent to notify a network administrator that mismatching occurs on the AS path information in the R33.

Figure 4:
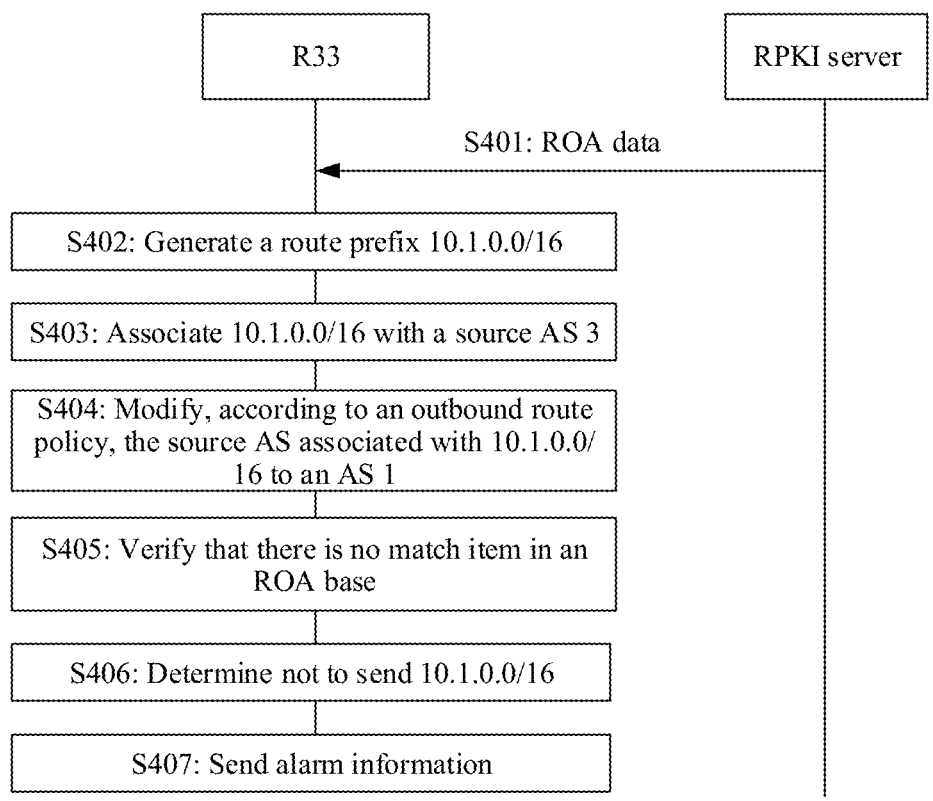
FIG. 4 is a schematic flowchart of a method according to an embodiment of the present disclosure.

FIG. 4 is a schematic flowchart of a method according to an embodiment of the present disclosure. With reference to FIG. 1, the R33 in FIG. 1 is used as an execution body, and the route prefix 10.1.0.0/16 is used as an example. In FIG. 4, 10.1.0.0/16 is generated by an AS 3, for example, by the R33.

S401: The R33 downloads ROA data from an RPM server, so that the R33 locally stores the ROA data, which is also referred to as an ROA base. An entry in the ROA base records a correspondence between a route prefix and a source AS, and is used to verify whether the source AS associated with the route prefix is correct.

For example, in a network planning phase, if an administrator for the AS 3 registers with an international organization corresponding to the RPM server, a source AS associated with 10.1.0.0/16 as the AS 3. The ROA data downloaded by the R33 includes a correspondence between 10.1.0.0/16 and the source AS 3. In other words, the ROA data downloaded by the R33 includes 10.1.0.0/16, and the source AS corresponding to 10.1.0.0/16 is the AS 3.

It may be understood that the ROA data may not need to be downloaded each time when the method shown in the embodiment in FIG. 4 is performed.

S402: The R33 generates the route prefix 10.1.0.0/16.

S403: The R33 associates 10.1.0.0/16 with the source AS 3. When the R33 sends route information carrying 10.1.0.0/16 to an AS 4, the R33 inserts, to the AS path corresponding to 10.1.0.0/16, information about an AS in which the R33 is located (namely, the AS 3). In this case, the AS 3 is the source AS associated with 10.1.0.0/16.

S404: Before the R33 sends 10.1.0.0/16 to the AS 4, the R33 modifies the AS information according to an outbound route policy configured on the R33. In the embodiment in FIG. 4, the AS information before verification is referred to as AS information associated with the route prefix, and the associated AS information includes the to-be-verified AS information. It is assumed that an AS path after modification is (AS 1), the AS information associated with 10.1.0.0/16 is (AS 1), and the to-be-verified AS information is the source AS information, namely, the AS 1.

S405: The R33 verifies that there is no match item in the ROA data. The to-be-verified source AS information is the AS 1, but the source AS corresponding to 10.1.0.0/16 in the ROA base is the AS 3. The AS 1 is different from the AS 3. Therefore, the R33 determines that there is no match item in the ROA data. Step S406 is performed.

S406: The R33 determines not to send 10.1.0.0/16. Then, step S407 may be performed.

The following describes several other possible implementations by using examples based on the embodiment in FIG. 4. It should be understood that the implementations are not limited to these possible implementations.

In a possible case, referring to Case 1 in the embodiment in FIG. 2 in which step S404 is not performed, or although step S404 is performed, the source AS corresponding to the AS path after modification in step S404 is still the AS 3 (for example, the AS path after modification in step S404 is (AS 2, AS 3)), the R33 determines that there is a match item in the ROA data. Refer to Case 1 in the embodiment in FIG. 2.

In a possible case, if there is no entry matching 10.1.0.0/16 in the ROA database, the R33 determines that there is no match item in the ROA data. Refer to Case 3 in the embodiment in FIG. 2.

In the embodiment in FIG. 4, steps S401, S404, and S407 are optional. In addition, a sequence of the steps is merely an example, and the steps may also be performed in another appropriate sequence. For example, step S401 may be performed before step S405.

In the foregoing example, the R33 generates 10.1.0.0/16. Therefore, the source AS associated with 10.1.0.0/16 is the AS 3. It should be understood that 10.1.0.0/16 may also be generated by an R31 or an R32 and sent to the R33. In this case, the source AS associated with 10.1.0.0/16 is still the AS 3. For an execution method, refer to the embodiment in FIG. 4. Details are not described again.

In the embodiment shown in FIG. 4, before sending the route prefix whose source AS is the AS 3, a network device in the AS 3 first verifies the source AS information associated with the route prefix, and determines, based on the verification result, whether to send the route prefix, to improve accuracy of the source AS information in the sent route information, and reduce a possibility of causing an abnormal network flow direction. For other beneficial effects, refer to the description of beneficial effects in the embodiment in FIG. 2.

Embodiments in FIG. 2 to FIG. 4 describe a case in which the R33 is the execution body. In another implementation, an R31 or an R32 in the AS 3 may also establish a connection with the RPM server, downloads the ROA data or the ASPA data, and verifies the AS information corresponding to 10.1.0.0/16 before sending 10.1.0.0/16. For a specific method, refer to steps performed by the R33 in the embodiments in FIG. 2 to FIG. 4. Details are not described herein again.

In the embodiments in FIG. 2 to FIG. 4, the R33 downloads the ROA data or the ASPA data from the RPM server. In another possible design, the RPM server actively pushes the ROA data or the ASPA data to the R33.

Figure 5:
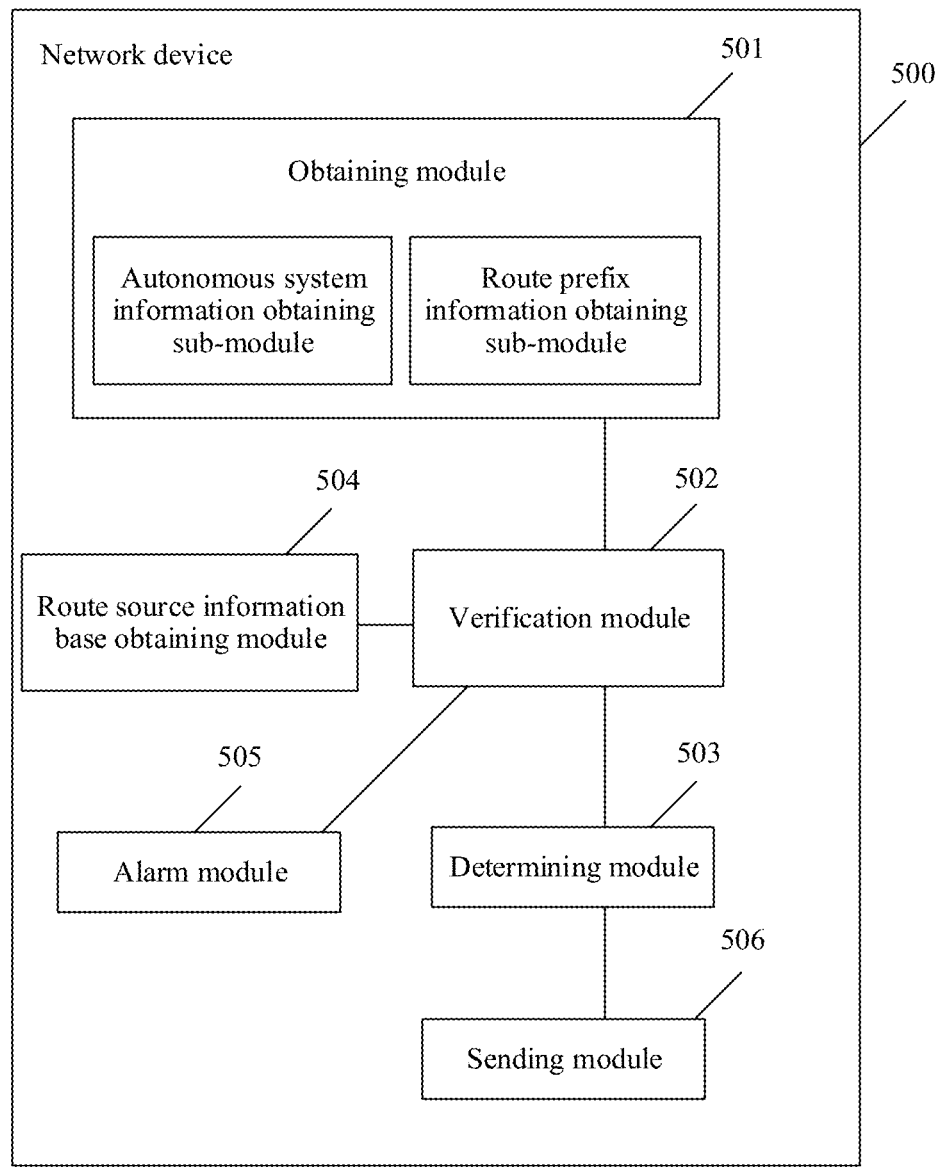
FIG. 5 is a schematic diagram of a structure of a network device according to an embodiment of the present disclosure.

FIG. 5 is a schematic diagram of a possible structure of a network device in the method embodiment. The network device 500 may be the R31, the R32, or the R33 in FIG. 1. If the network device 500 is the R33 in FIG. 1, the network device 500 implements a function of the R33 in the embodiment shown in FIG. 2, FIG. 3, or FIG. 4. Referring to FIG. 5, the network device 500 includes an obtaining module 501, a verification module 502, and a determining module 503. These modules may perform corresponding function of the network device in the method embodiment. The obtaining module may include a route prefix obtaining sub-module and an autonomous system information obtaining sub-module, configured to support the network device 500 in performing steps S202 to S205 in FIG. 2, steps S302 to S305 in FIG. 3, or steps S402 to S404 in FIG. 4. The verification module 502 is configured to support the network device 500 in performing step S205 in FIG. 2, step S305 in FIG. 3, or step S405 in FIG. 4. The determining module 503 is configured to support the network device 500 in performing steps S206 to S208 in FIG. 2, step S306 in FIG. 3, or step S406 in FIG. 4. The network device 500 further includes a route origin information base obtaining module 504 and a sending module 506. The route origin information base obtaining module 504 is configured to support the network device 500 in performing step S201 in FIG. 2, step S301 in FIG. 3, or step S401 in FIG. 4. The sending module 506 is configured to support the network device 500 in performing step S210 in FIG. 2. Optionally, the network device 500 further includes an alarm module 505, configured to support the network device 500 in performing step S209 in FIG. 2, step S307 in FIG. 3, or step S407 in FIG. 4.

For a specific execution process, refer to detailed descriptions of corresponding steps in the embodiment shown in FIG. 2, FIG. 3, or FIG. 4. Details are not described herein again.

When an integrated module is used, modules in the embodiment in FIG. 5 may be integrated. For example, the verification module 502 and the determining module 503 in the embodiment in FIG. 5 may be combined into one module.

Figure 6:
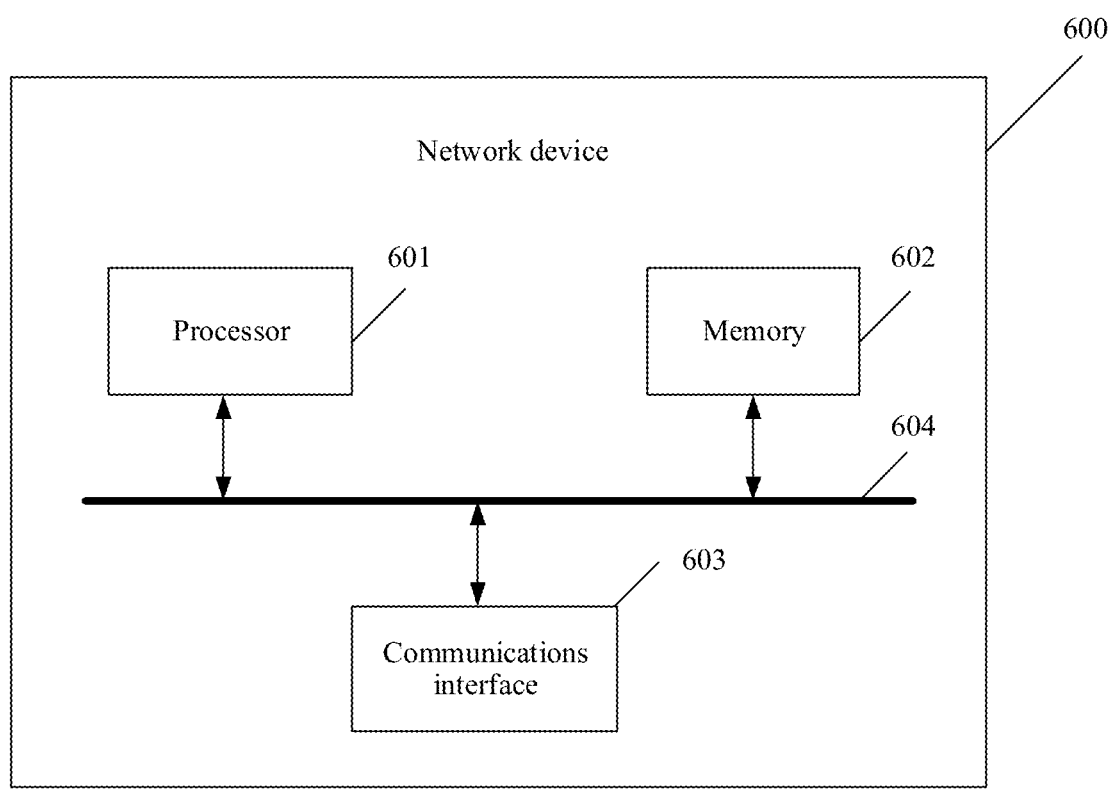
FIG. 6 is a schematic diagram of a structure of a network device according to an embodiment of the present disclosure.

FIG. 6 is a schematic diagram of a possible structure of a network device in the method embodiment. The network device 600 may be the R31, the R32, or the R33 in FIG. 1. If the network device 600 is the R33 in FIG. 1, the network device 600 implements a function of the R33 in the embodiment shown in FIG. 2, FIG. 3, or FIG. 4. The network device 600 includes a processor 601, a memory 602, a communications interface 603, and a bus 604. The processor 601, the communications interface 603, and the memory 602 are connected to each other through the bus 604. The bus 604 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 6, but this does not mean that there is only one bus or only one type of bus. The processor 601 is configured to store a computer program. The computer program includes a program instruction. The processor 601 is configured to invoke the program instruction to perform steps in FIG. 2, FIG. 3, or FIG. 4.

In a possible design, the communications interface 603 performs steps S201, S202, S209, and S210 in FIG. 2, steps S301, S302, and S307 in FIG. 3, or steps S401 and S407 in FIG. 4. The processor 601 is configured to invoke the program instruction to perform steps S203 to S208 in FIG. 2, steps S303 to S306 in FIG. 3, or steps S402 to S406 in FIG. 4.

An embodiment of the present disclosure further provides a computer storage medium. The computer-readable storage medium stores a program. When the program is run, the computer is enabled to implement the method in the method embodiment.

An embodiment of the present disclosure further provides a route processing apparatus, including hardware related to a program instruction. The hardware is used in the method in the method embodiment.

"First" mentioned in the embodiments of the present disclosure is merely used as a name identifier, and does not represent the first in sequence. This rule is also applicable to "second".

The method steps described in the content disclosed in the embodiments of the present disclosure may be implemented by hardware, or a processor by executing a software instruction. The software instruction may be formed by a corresponding software module, and the software module may be stored in a random access memory (random access memory, RAM), a flash memory, a read only memory (read only memory, ROM), an erasable programmable read only memory (erasable programmable ROM, EPROM), an electrically erasable programmable read-only memory (electrically EPROM, EEPROM), a hard disk, a removable hard disk, an optical disc, or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in an ASIC.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and beneficial effects of the present disclosure are further described in detail in the foregoing specific embodiments. It should be understood that the foregoing descriptions are merely specific implementations of the present disclosure, but are not intended to limit the protection scope of the present disclosure. Based on the technical solutions of the present disclosure, any modification, equivalent replacement, and improvement made shall fall within the protection scope of the present disclosure.

What is claimed is:

1. A route processing method, applied to a network device in a autonomous system, and comprising:
   obtaining a route prefix and to-be-verified source autonomous system information associated with the route prefix, wherein the to-be-verified source autonomous system information is obtained after executing an outbound route policy configured on the network device;
   verifying the route prefix and the to-be-verified source autonomous system information to obtain a verification result by matching the route prefix and the to-be-verified source autonomous system information with one or more entries of a route origin information base; and
   processing a route carrying the route prefix in accordance with the verification result.

2. The method according to claim 1, wherein an entry of the route origin information base records a correspondence between a route prefix and a source autonomous system; or
   an entry of the route origin information base records a correspondence between a route prefix and an autonomous system pair.

3. The method according to claim 1, wherein the route origin information base is obtained from a resource public key infrastructure server.

4. The method according to claim 1, wherein the obtaining the route prefix further comprises receiving the route prefix from a second autonomous system.

5. The method according to claim 1, wherein the network device is a border node in the first autonomous system.

6. The method according to claim 1, wherein
   the verifying the route prefix and the to-be-verified source autonomous system information to obtain the verification result comprises:
   verifying that there is no match item in the route origin information base in response to determining that there is an entry in the route origin information base matches the route prefix and source autonomous system information in the entry is different from the to-be-verified source autonomous system information; and
   the processing the route carrying the route prefix in accordance with the verification result comprises:
   determining not to send the route prefix.

7. The method according to claim 6, wherein when verifying that there is no match item in the route origin information base, the method further comprises:
   outputting alarm information.

8. The method according to claim 1,
   the verifying the route prefix and the to-be-verified source autonomous system information to obtain the verification result comprises:
   verifying that there is a match item in the route origin information base in response to determine that there is an entry in the route origin information base matches the route prefix and source autonomous system information in the entry is the same as the to-be-verified source autonomous system information; and
   the processing the route carrying the route prefix in accordance with the verification result comprises:
   determining to send the route prefix; and
   sending the route carrying the route prefix.

9. The method according to claim 1, wherein
   the verifying the route prefix and the to-be-verified source autonomous system information to obtain the verification result comprises:
   verifying that there is no match item in the route origin information base in response to determining that there is no entry in the route origin information base matches the route prefix in the route origin information; and
   the processing the route carrying the route prefix in accordance with the verification result comprises:
   performing, according to a preconfigured policy, sending process of the route carrying the route prefix.

10. A network device, wherein the network device is a network device in a autonomous system, and comprises:
    one or more processors;
    one or more memory configured to store a program, wherein the program is executed by the one or more processors to cause the network device to:
    obtain a route prefix, and to-be-verified source autonomous system information associated with the route prefix, wherein the to-be-verified source autonomous system information is obtained after executing an outbound route policy configured on the network device;
    verify the route prefix and the to-be-verified source autonomous system information by matching the route prefix and the to-be-verified source autonomous system information with one or more entries of a route origin information base; and
    process a route carrying the route prefix in accordance with the verification result.

11. The network device according to claim 10, wherein an entry of the route origin information base records a correspondence between a route prefix and a source autonomous system; or
    an entry of the route origin information base records a correspondence between a route prefix and an autonomous system pair.

12. The network device according to claim 10, wherein the program further comprises one or more communication interfaces configured to:
    receive the route origin information base from a resource public key infrastructure server.

13. The network device according to claim 10, further comprises one or more communication interfaces, the one or more communication interfaces are configured to receive the route prefix from a second autonomous system.

14. The network device according to claim 10, wherein the program is executed by the one or more processor to cause the apparatus to generate the route prefix.

15. The network device according to claim 10, wherein the network device is a border node in the first autonomous system.

16. The network device according to claim 10, wherein the program is executed by the one or more processors to cause the apparatus to verify the route prefix and the to-be-verified source autonomous system information to obtain the verification result by performing operations including:
    verifying that there is no match item in the route origin information base in response to determining that there is an entry in the route origin information base matches the obtained route prefix and source autonomous system information in the entry is different from the to-be-verified source autonomous system information; and
    determining not to send the route prefix based on the verification that there is no match item in the route origin information base.

17. The network device according to claim 16, further comprises one or more communication interfaces, the one or more communication interfaces are configured to output alarm information after verifying that there is no match item in the route origin information base.

18. The network device according to claim 10, wherein the program is executed by the one or more processor to cause the apparatus to verify the route prefix and the to-be-verified source autonomous system information to obtain the verification result by performing operation including:
   verifying that there is an entry in the route origin information base matches the route prefix and autonomous system information in the entry is the same as the to-be-verified source autonomous system information; and
   wherein the program is executed by the one or more processor to cause the apparatus to process a route carrying the route prefix in accordance with the verification result by performing operations including: sending the route carrying the route prefix.

19. The network device according to claim 10, wherein the program is executed by the one or more processor to cause the apparatus to verify the route prefix and the to-be-verified source autonomous system information to obtain the verification result by performing operation including:
   verifying that there is no match item in the route origin information base in response to determining that there is no entry in the route origin information base matches the obtained route prefix; and
   wherein the program is executed by the one or more processor to cause the apparatus to process a route carrying the route prefix in accordance with the verification result by performing operations including: performing, based on the verification and a preconfigured policy, a sending process of the route prefix.

20. A non-transitory computer-readable storage medium storing a program, the program being executed on a computer that is enabled to perform the method:
   obtaining a route prefix and to-be-verified source autonomous system information associated with the route prefix, wherein the to-be-verified source autonomous system information is obtained after executing an outbound route policy configured on a network device;
   verifying the route prefix and the to-be-verified source autonomous system information to obtain a verification result by matching the route prefix and the to-be-verified source autonomous system information with one or more entries of a route origin information base; and
   processing a route carrying the route prefix in accordance with the verification result.

21. The non-transitory computer-readable storage medium according to claim 20, wherein an entry of the route origin information base records a correspondence between a route prefix and a source autonomous system; or
   an entry of the route origin information base records a correspondence between a route prefix and an autonomous system pair.

22. The non-transitory computer-readable storage medium according to claim 20, wherein the verifying the route prefix and the to-be-verified source autonomous system information to obtain the verification result comprises:
   verifying that there is no match item in the route origin information base in response to determining that there is an entry in the route origin information base matches the route prefix and source autonomous system information in the entry is different from the to-be-verified source autonomous system information; and
   the processing the route carrying the route prefix in accordance with the verification result comprises:
   determining not to send the route prefix.

23. The non-transitory computer-readable storage medium according to claim 20, wherein the verifying the route prefix and the to-be-verified source autonomous system information to obtain the verification result comprises:
   verifying that there is a match item in the route origin information base in response to determine that there is an entry in the route origin information base matches the route prefix and source autonomous system information in the entry is the same as the to-be-verified source autonomous system information; and
   the processing the route carrying the route prefix in accordance with the verification result comprises:
   determining to send the route prefix; and
   sending the route carrying the route prefix.

* * * * *